United States Patent [19]

Pimenov et al.

[11] 4,311,530
[45] Jan. 19, 1982

[54] CONCRETE MIX AND PROCESS FOR THE MANUFACTURE OF CHEMICALLY STABLE STRUCTURES AND ARTICLES THEREFROM

[76] Inventors: Anatoly N. Pimenov, ulitsa Sudostroitelnaya, 14/16, kv. 120; Ivan E. Putlyaev, Profsojuznaya ulitsa, 75, korpus 1, kv. 53; Vladimir A. Otrepiev, ulitsa Belovezhskaya, 1, kv. 22; Evgeny A. Guzeev, ulitsa Novo-Alexeevskaya, 4, korpus 2, kv. 37; Natalya F. Shesterkina, ulitsa Molostovykh, 4, korpus 4, kv. 363, all of Moscow; Vasily V. Paturoev, Oktyabrsky prospekt, 164, kv. 32, Ljubertsy Moskovskoi oblasti; Dmitry A. Pankovsky, B. Akademicheskaya, 73, korpus 1, kv. 47, Moscow, all of U.S.S.R.

[21] Appl. No.: 169,182

[22] Filed: Jul. 15, 1980

[51] Int. Cl.$^3$ .............................................. C04B 19/04
[52] U.S. Cl. ................................. 106/84; 106/DIG. 2
[58] Field of Search ............................. 106/84, DIG. 2

[56] References Cited
U.S. PATENT DOCUMENTS 3,658,564  4/1972  Gerow et al. ............................. 106/84

*Primary Examiner*—James Poer
*Attorney, Agent, or Firm*—Robert E. Burns; Emmanuel J. Lobato; Bruce L. Adams

[57] ABSTRACT

A distinctive feature of the concrete mix according to the present invention resides in that the active filler incorporated therein has a fraction with a particle size of from 0.01 to 0.1 mm; as the acid-alkali-stable aggregate use is made of a material selected from the group consisting of sand and a mixture of sand and rubble at a weight ratio therebetween of from 1:1.07 to 1:1.25. The mixture has the following proportions of the ingredients, percent by weight:

| binder | 9–14 |
|---|---|
| active filler | 19–32 |
| aggregate | the balance. |

The process according to the present invention consists in that prior to the moulding the resulting mix is cured in hermetically closed vessels for 7 to 14 days and the heat-treatment of the moulded mix to produce the final articles therefrom is effected under the following conditions: heating to 160°–200° C. for 4 to 9 hours, curing for 3–3.5 hours at this temperature and cooling to 20°–25° C. for 5 to 10 hours.

12 Claims, No Drawings

CONCRETE MIX AND PROCESS FOR THE MANUFACTURE OF CHEMICALLY STABLE STRUCTURES AND ARTICLES THEREFROM

BACKGROUND OF THE INVENTION

The present invention relates to the building materials intended for the manufacture of building structures and articles and, more specifically, to a concrete mix and processes for the manufacture of chemically stable structures operating under the conditions of strongly aggressive liquid or gaseous media having predominantly an acidic reaction.

The concrete mix according to the present invention is useful in the manufacture of both supporting and self-supporting, mainly reinforced structures, as well as non-reinforced articles having different dimensions and shape, Different concrete mixes employed for the manufacture of chemically stable structures and articles to be used under the conditions of aggressive media are known among the most widespread concrete mixes recently employed are the polymer-concrete mixes, wherein as a binding agent use is made of various synthetic resins: epoxy, unsaturated polyester resins, phenolic, furan, carbamide, polyurethane, acrylic resins and the like.

These materials generally possess high durability characteristics and an increased chemical stability. However, they are too expensive and have high toxicity in the manufacture. Another essential disadvantage of all the above-mentioned materials based on synthetic resins resides in their inflammability and a low heat-resistance, as well as a limited stability in oxidizing acids.

Also known are acid-resistant concretes incorporating water glass, acid-resistant fillers and aggregates and modifying admixtures. As a curing agent in such concrete mixes use is generally made of salts of fluosilicic acid. Such concrete mixes are widely employed for the manufacture of prefabricated and monolithic structures operating under the conditions of acidic aggressive media. A disadvantage of these concrete mixes is their insufficient mechanical strength not exceeding 250 kgf/cm$^2$ (compression) and a low water-resistance. Furthermore, salts of fluosilicic acid are very toxic and cause corrosion of steel reinforcement members. The process for the manufacture of structures from such mixes comprises intermixing water glass with aggregates, moulding of the ready mix in a mould, followed by heat-treatment thereof at a temperature of from 80° to 120° C.

Recently in the Soviet Union there has been developed a material known as silicoconcrete containing a high silica-content silicate clod, finely ground quartz sand, general sand, rubble and water. The silicoconcrete features high mechanical strength properties; thus, its compression strength is 500 kgf/cm$^2$; it also has a high density. Acid-stability of silicoconcrete is at least 97%. Such concrete mixtures are employed for the manufacture of prefabricated reinforced concrete members.

The process of manufacturing such prefabricated members involves moulding and densification of the final mix and a heat-moisture treatment by the schedule: pressure elevation in an autoclave up to 12 atm for 3-4 hours, curing under 12 atm-21 hours, releasing pressure to zero over 3-4 hours. However, silicoconcrete has some disadvantages caused by certain difficulties in the preparation of a special high-silica-content glass, associated with the necessity of using very high temperatures (up to 1,580° C.) for its smelting. Moreover, for hardening the products made from ceramsite concrete, curing is necessary under a high pressure for a long period. All this results in a complicated process technology and, hence, in an increased cost of production of the final articles.

Concrete mixes for the manufacture of acid-resistant articles incorporating water glass, finely ground perlite, perlite sand and andesite rubble are also known in the art.

Such mixes have but insufficient mechanical strength and a low water-resistance. The process for the manufacture of articles from such mixes comprises mixing of aggregates with liquid glass, followed by moulding and heat-treatment of the moulded articles. Prior to the heat-treatment the moulded articles are subjected to a 4-day curing and the heat-treatment is conducted as follows: heating within the range of from 50° to 70° C. for 3 hours, within the range of from 80° to 100° C. for 2 hours; at a temperature of from 120° to 150° C. for 3 hours. The resulting acid-resistant articles have an ultimate compression strength of 280–290 kgf/cm$^2$, bending strength—96–100 kgf/cm$^2$. This process for the manufacture of acid-resistant articles does not enable the production of high-strength, dense steel-reinforced articles.

SUMMARY OF THE INVENTION

It is the main object of the present invention to provide a concrete mix possessing a high mechanical strength and density.

It is another object of the present invention to provide a concrete mix possessing a high acid-, water and alkali-stability.

It is still another object of the present invention to provide a concrete mix which would be non-inflammable and non-toxic.

It is a further object of the present invention to reduce the duration of the heat-moisture treatment of articles.

It is a still further object of the present invention to reduce power consumption for the heat-treatment.

It is also an object of the present invention to provide a process for the manufacture of chemically stable structures and articles from the resulting concrete mix.

These and other objects are accomplished by the provision of a concrete mix incorporating a binder based on liquid glass, a finely ground active filler pertaining to the group of volcanic water-containing glass and an alkali-acid-stable aggregate, wherein, in accordance with the present invention, said active filler is employed as a fraction with a particle size of from 0.01 to 0.1 mm and as the aggregate use is made of quartz sand or quartz sand and rubble at a weight ratio therebetween of from 1:1.07 to 1:1.25, the components being employed in the following proportions, percent by weight:

| | |
|---|---|
| binder | 9–14 |
| active filler | 19–32 |
| aggregate | the balance. |

As the active filler in accordance with the present invention it is advisable to use perlite, obsidian (volcanic glass) and vitrophyre.

The object of the present invention is also accomplished by a process for the manufacture of chemically stable structures and articles from the concrete mix of the present invention which comprises moulding of the resulting mix and subsequent heat-treatment thereof, wherein in accordance with the present invention the final mix is kept in hermetically sealed vessels for a period of from 7 to 14 days prior to the moulding, while the heat-treatment of the moulded mix to obtain the final articles therefrom is conducted following the schedule: heating to 160°–200° C. for 4–9 hours, curing for 3–3.5 hours and cooling to 20°–25° C. for 5–10 hours.

The present invention resides in the following.

In the concrete mix according to the present invention fine-dispersed fillers pertaining to the group of acid volcanic water-containing glass can be chemically active components of concretes based on liquid glass at a specific degree of fineness. Their activity is revealed at an elevated temperature. As a result of hardening of the composition, the formed tetrahydrosilicate chemically reacts with the alkali to give a crystal hydrate. The content of the binding agent in the system should be strictly limited. At a higher content of liquid glass the concrete mix is swollen upon hardening and loosened due to liberation of free water. At a lower content of liquid glass in the mix there is observed an insufficient densification of the inter-grain voids thus causing pores in concrete.

The affinity of the resulting crystal hydrate to the aggregate creates conditions for a high adhesion strength in the contact zone and, hence, for the concrete density.

Since the resulting crystal hydrate has a high silica modulus, the final concrete has an increased water-resistance.

The absence of gel of silicic acid in the concrete mix imparts an increased alkali-resistance to the mix.

Preliminary curing of the final mixture in hermetically sealed vessels creates the most favourable conditions for diffusion of the binder towards the surface of fillers and aggregates. The mix curing time below 7 days does not ensure a complete wetting of the surface of the filler and aggregate with liquid glass. At a curing duration above 14 days there is observed "pre-drying" of the mix both at the account of the binder carbonization and at the account of the adsorption of the liquid by the surface of the solid phase.

At temperatures below 160° C. the reaction of the formation of stable crystal hydrates are either slowed-down or do not occur at all. At a temperature above 200° C. side processes can occur in concrete associated with recrystallization of silica, thus causing considerable stresses in the material and the formation of microdefects.

For a better understanding of the present invention, some specific examples are given hereinbelow by way of illustration.

The concrete mix according to the present invention is prepared in several formulations (see Tables 1 to 6). First effected is weight dosage of the starting components, then the dry components are intermixed. Thereafter, the dry mixture is intermixed with liquid glass in a standard-type mixer.

TABLE 1

| Components | Formulations, % by weight | | |
|---|---|---|---|
| | I | II | III |
| Liquid glass, sodium | 13 | 13.5 | 14 |
| Fine-dispersed perlite | 32 | 31.5 | 31 |
| Quartz sand | 55 | 55 | 55 |

TABLE 2

| Components | Formulations, % by weight | | |
|---|---|---|---|
| | I | II | III |
| Liquid glass, sodium | 9 | 9.5 | 10 |
| Fine-dispersed perlite | 20 | 19.5 | 19 |
| Quartz sand | 33 | 34 | 35 |
| Rubble, granite | 38 | 37 | 36 |

TABLE 3

| Components | Formulations, % by weight | | |
|---|---|---|---|
| | I | II | III |
| Liquid glass, sodium | 13 | 13.5 | 14 |
| Fine-dispersed obsidian | 32 | 31.5 | 31 |
| Quartz sand | 55 | 55 | 55 |

TABLE 4

| Components | Formulations, % by weight | | |
|---|---|---|---|
| | I | II | III |
| Liquid sodium glass | 9 | 9.5 | 10 |
| Fine dispersed obsidian | 20 | 19.5 | 19 |
| Quartz sand | 33 | 34 | 35 |
| Granite rubble | 38 | 37 | 36 |

TABLE 5

| Components | Formulations, % by weight | | |
|---|---|---|---|
| | I | II | III |
| Liquid sodium glass | 13 | 13.5 | 14 |
| Fine-dispersed vitrophyre | 32 | 31.5 | 31 |
| Quartz sand | 55 | 55 | 55 |

TABLE 6

| Components | Formulations, % by weight | | |
|---|---|---|---|
| | I | II | III |
| Liquid sodium glass | 9 | 9.5 | 10 |
| Fine-dispersed vitrophyre | 20 | 19.5 | 19 |
| Quartz sand | 38 | 39 | 35 |
| Granite rubble | 38 | 37 | 36 |

For the manufacture of samples of articles there are selected two kinds of concrete mixes (see Tables 1 and 2). The resulting mixes are discharged from the mixer and placed into polyethylene bags. The latter bags are hermetically sealed and the mix is kept therein for a period of from 7 to 14 days. After expiration of a specified period the bags are opened, the mix is charged into moulds and densified. The freshly moulded articles in the same moulds are subjected to a heat-treatment according to the following schedule: temperature elevation to 160°–200° C. for 5 hours, curing at this temperature for 3 hours, cooling to 20°–25° C. for 6 hours. Extraction of the articles from the moulds is effected after their cooling.

The results of tests of the samples produced from the above-specified concrete mixes according to the present invention are shown in Table 7.

TABLE 7

| Mix employed | Mix curing time, days | Heating temperature of freshly moulded articles, °C. | Properties of the final articles ||||||
|---|---|---|---|---|---|---|---|---|---|
| | | | Compression strength MPa | Bending strength MPa | Acid-stability, % | Water-stability, % | Alkali stability, % | Acid absorption, % | Water absorption, % |
| Mix 1 (Table 1) | 7 | | 150 | 45 | 99.0 | 78 | 59.0 | 0.36 | 0.65 |
| | 10 | 160 | 155 | 47 | 99.1 | 79 | 59.6 | 0.35 | 0.63 |
| | 14 | | 150 | 45 | 99.0 | 78 | 59.5 | 0.34 | 0.60 |
| | 7 | | 150 | 45 | 99.0 | 78 | 59.5 | 0.33 | 0.60 |
| | 10 | 180 | 160 | 53 | 99.2 | 80 | 60.0 | 0.32 | 0.57 |
| | 14 | | 155 | 47 | 99.1 | 79 | 59.7 | 0.32 | 0.59 |
| | 7 | | 150 | 45 | 99.0 | 78 | 59.5 | 0.36 | 0.61 |
| | 10 | 190 | 160 | 53 | 99.2 | 79 | 59.6 | 0.35 | 0.60 |
| | 14 | | 155 | 47 | 99.1 | 79 | 59.6 | 0.36 | 0.60 |
| Mix 2 (Table 2) | 7 | | 130 | 40 | 99.1 | 77 | 58.0 | 0.37 | 0.67 |
| | 10 | 160 | 130 | 40 | 99.2 | 76 | 59.0 | 0.37 | 0.66 |
| | 14 | | 136 | 42 | 99.2 | 78 | 59.1 | 0.36 | 0.67 |
| 1 | 2 | 3 | 4 | 5 | 6 | 7 | 8 | 9 | 10 |
| | 7 | | 132 | 41 | 99.3 | 79 | 59.5 | 0.31 | 0.57 |
| | 10 | 180 | 135 | 42 | 99.2 | 83 | 59.7 | 0.30 | 0.55 |
| | 14 | | 140 | 43 | 99.3 | 80 | 59.7 | 0.30 | 0.53 |
| | 7 | | 130 | 40 | 99.0 | 75 | 58.8 | 0.38 | 0.62 |
| | 10 | 190 | 135 | 42 | 99.0 | 76 | 59.0 | 0.37 | 0.63 |
| | 14 | | 135 | 42 | 99.1 | 77 | 59.2 | 0.38 | 0.65 |

The above-given data demonstrate that the samples and articles are made of concrete mixes with different active fillers and aggregates. The time of preliminary curing of the prepared concrete mixes and the temperature of heat-moisture treatment of the moulded mixes are different.

The articles manufactured from the above-described concrete mixes by the process according to the present invention possess a high mechanical strength, density, as well as an increased acid-, water- and alkali-resistance. Furtheremore, the articles are non-toxic and non-inflammable.

The process for the manufacture of chemically stable concrete structures and articles according to the present invention provides the possibility for the manufacture of more durable and dense articles without, however, lowering their chemical stability. The process according to the present invention makes it possible to produce chemically stable structures and articles on the basis of commercial liquid glass.

What is claimed is:

1. A concrete mix comprising: a binding agent based on liquid glass; a fine-dispersed active filler of the group of volcanic water-containing glass of a fraction of from 0.01 to 0.1 mm particle size; an acid-alkali-stable aggregate selected from the group consisting of sand and a mixture of sand and rubble at a weight ratio ranging from 1:1.07 to 1:1.25, wherein said components are present in the mix in the following proportions, in % by weight:

| binder | 9–14 |
|---|---|
| active filler | 19–32 |
| aggregate | the balance. |

2. A concrete mix according to claim 1, wherein as the active filler use is made of perlite.

3. A concrete mix according to claim 1, wherein as the active filler use is made of obsidian.

4. A concrete mix according to claim 1, wherein as the active filler use is made of vitrophyre.

5. A process for the manufacture of chemically resistant structures and articles from a concrete mix consisting essentially of 9 to 14% by weight of a binder based on a liquid glass, 19 to 32% by weight of a fine dispersed active filler selected from the group of volcanic water-containing glass with a particle size of from 0.01 to 0.1 mm and an acid-alkali-stable aggregate selected from the group consisting of sand and a mixture of sand and rubble at a weight ratio therebeween of from 1:1.07 to 1:1.25, comprising curing the concrete mix in hermetically sealed vessels for a period of from 7 to 14 days, molding the cured mix and heat treating the molded mix to produce final articles therefrom, by heating said molded mix to a temperature of from 160° to 200° C. for about 4 to 9 hours, then curing the molded mix for about 3 to 3.5 hours and finally cooling said molded mix to a temperature of from 20° to 25° C. for a period of from about 5 to 10 hours.

6. A process according to claim 5 wherein said active filler is selected from a member of the group consisting of perlite, obsidian and vitrophyre.

7. A process according to claim 5 wherein said active filler is perlite.

8. A process according to claim 5 wherein said active filler is obsidian.

9. A process according to claim 5 wherein said active filler is vitrophyre.

10. A concrete mix according to claim 1 in which said active filler is selected from the group consisting of perlite, obsidian and vitrophyre.

11. The molded product obtained by curing and molding the concrete mix defined in one of claims 1–4 or 10.

12. A chemically resistant structure obtained according to one of claims 5 to 9.

* * * * *